Dec. 20, 1960   F. S. BARKER   2,965,531
METHOD OF MAKING SHINGLE PANEL
Original Filed Jan. 29, 1957   5 Sheets-Sheet 1

INVENTOR.
FRANK S. BARKER
BY
Hyde, Meyer, Baldwin & Doran
ATTORNEYS

Dec. 20, 1960    F. S. BARKER    2,965,531
METHOD OF MAKING SHINGLE PANEL
Original Filed Jan. 29, 1957    5 Sheets-Sheet 4
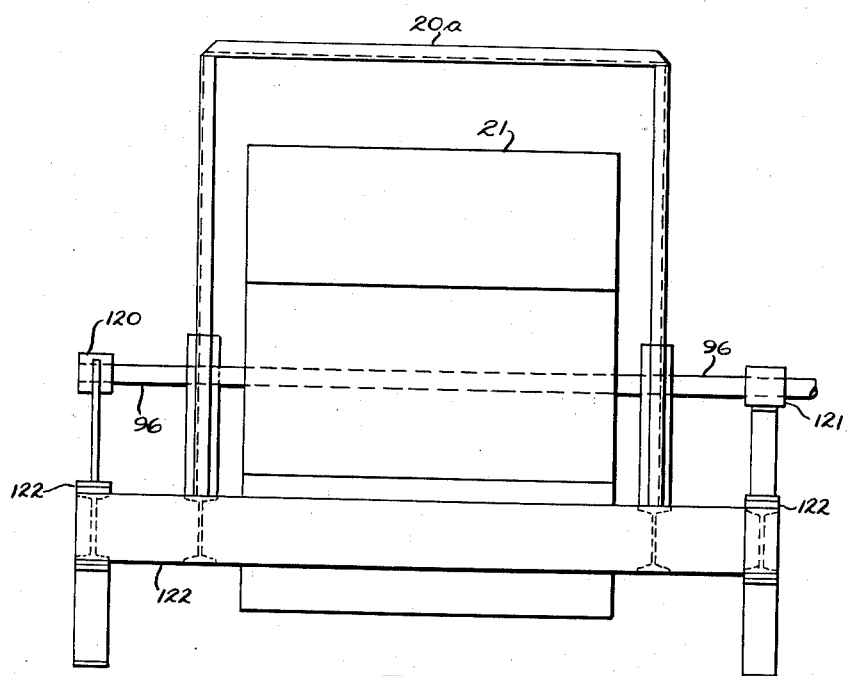
Fig. 4
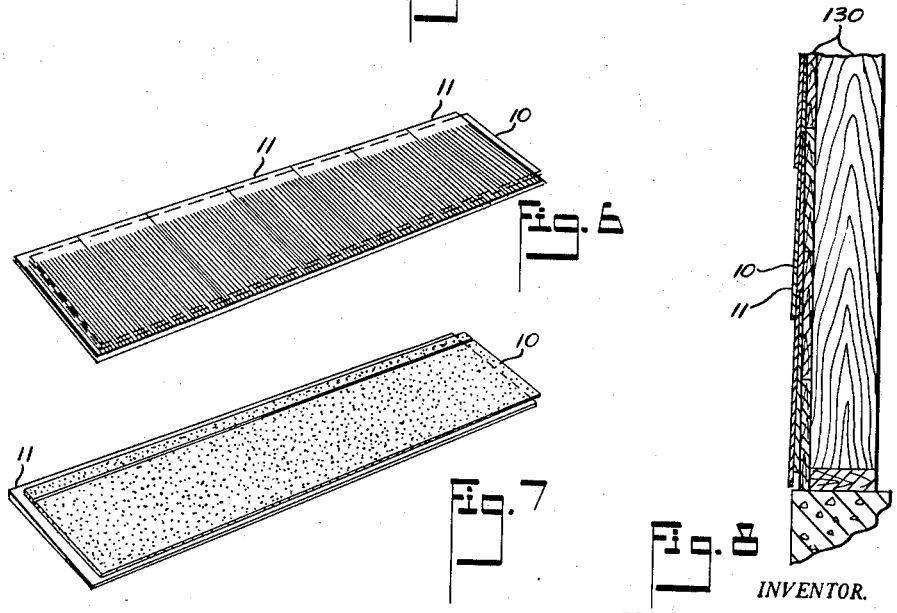
Fig. 6
Fig. 7
Fig. 8
INVENTOR.
FRANK S. BARKER
BY
Hyde, Meyer, Baldwin & Doran
ATTORNEYS Dec. 20, 1960 F. S. BARKER 2,965,531
METHOD OF MAKING SHINGLE PANEL
Original Filed Jan. 29, 1957 5 Sheets-Sheet 5
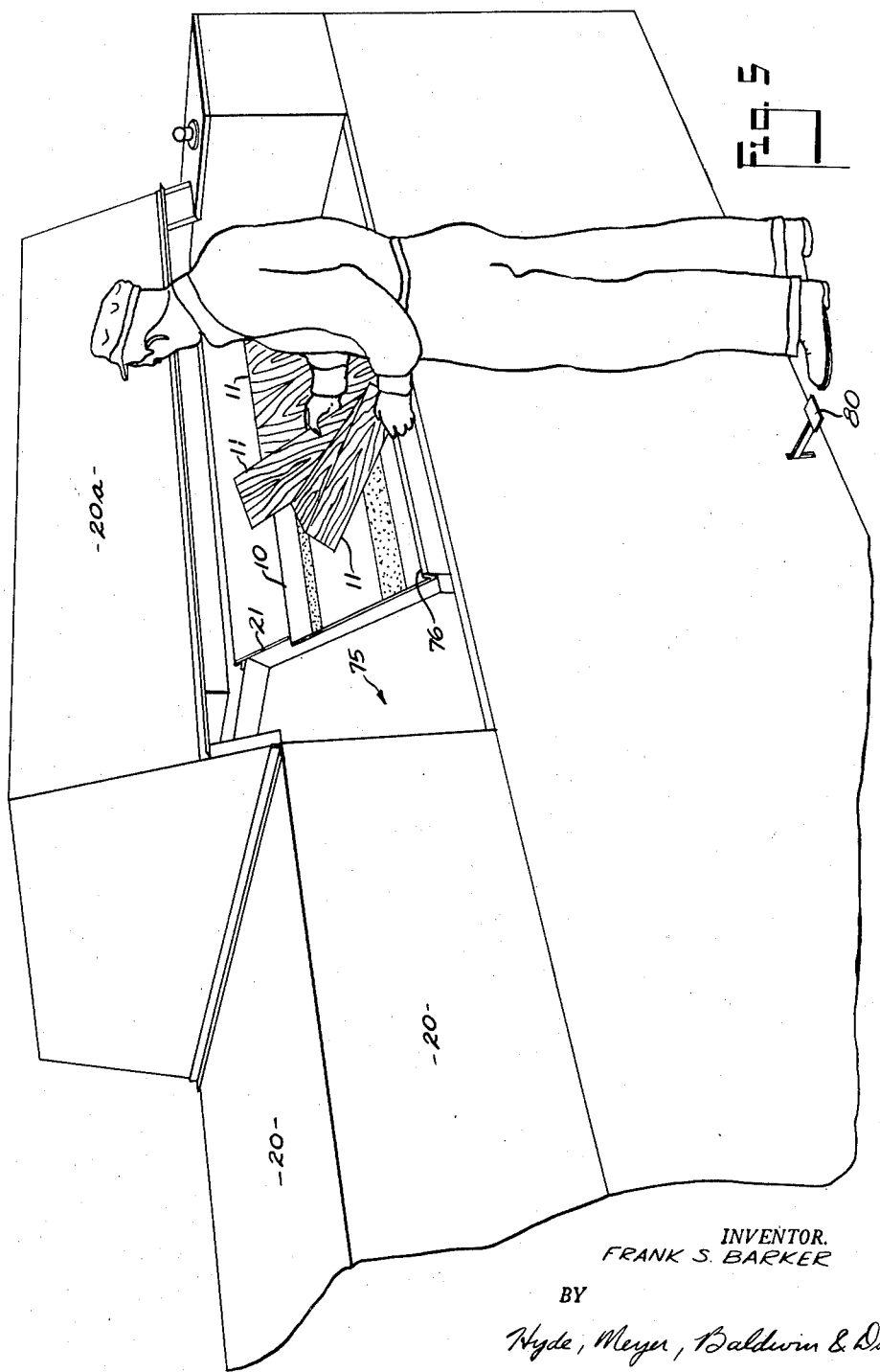
INVENTOR.
FRANK S. BARKER
BY
Hyde, Meyer, Baldwin & Doran
ATTORNEYS

United States Patent Office 2,965,531
Patented Dec. 20, 1960

2,965,531

METHOD OF MAKING SHINGLE PANEL

Frank S. Barker, South Russell Village, Ohio, assignor to Shakertown Corporation, Cleveland, Ohio, a corporation of Ohio Original application Jan. 29, 1957, Ser. No. 636,987, now Patent No. 2,934,110, dated Apr. 26, 1960. Divided and this application Dec. 18, 1957, Ser. No. 703,698

2 Claims. (Cl. 154—122)

This invention relates to a method for manufacturing construction units, and more particularly to a method for securing shakes or shingles to a backing board.

The present application is a division of my copending application, Serial No. 636,987, filed January 29, 1957, now Patent No. 2,934,110, and entitled "Apparatus for and Methods of Making Shingle Panels."

An object of the present invention is to provide a method which involves the removal of backing boards, one by one, from a supply source and the application of adhesive to selective portions of the removed backing board; then after application of suitable shakes or shingles to said backing board, the advance of the construction unit to a heating unit wherein the adhesive is dried or set and the shakes or shingles become permanently secured to the backing board.

Another object of the invention is to provide a method in which the various steps of advancing the backing board from a supply source, and applying adhesive strips to selective portions of the backing board, etc., are accomplished with an unusual degree of dispatch, so that the backing board containing adhesive strips may be further supplied with shakes, heated to dry or set the adhesive and discharged at a relatively rapid rate as compared with existing practices.

Another object of the present invention is to provide a method for making shingle panels which are characterized by their structural simplicity, the ease of assembly of their parts, their strong and sturdy nature and their low manufacturing cost.

Further objects of the present invention and certain practical advantages will be referred to in or will be evident from the following description of one embodiment of the invention, as illustrated in the accompanying drawings, in which:

Fig. 2A is an exploded isometric view showing the adhesive drying means in engagement with the construction unit, in an adhesive drying operation.

Fig. 4 is an end view of the drum rotatably mounted within its frame.

Fig. 5 is a perspective view showing an operator placing the shakes or shingles upon the baseboard of the prefabricated construction unit as it is held in place in the machine.

Fig. 6 is a front perspective view of a construction unit as manufactured by the present machine.

Fig. 7 is a rear perspective view of the construction unit showing the manner in which the shakes or shingles are attached to the baseboard.

Fig. 8 is an enlarged fragmentary vertical sectional view showing a plurality of the construction units of the present invention forming the outer covering of a building wall.

Before describing in detail the herein disclosed embodiment of the invention, it is to be understood that the present invention is not limited to the structural details or the particular arrangement of parts herein shown, as methods embodying the present invention may take other forms. It also is to be understood that the phraseology and terminology herein used are for purposes of description and not of limitation, as the scope of the present invention is denoted by the appended claims.

It is believed that a preliminary explanation of the successive steps in the present machine's function will facilitate and expedite an understanding of the various machine sections and their cooperation in carrying out the objectives of the invention.

Figure 1:
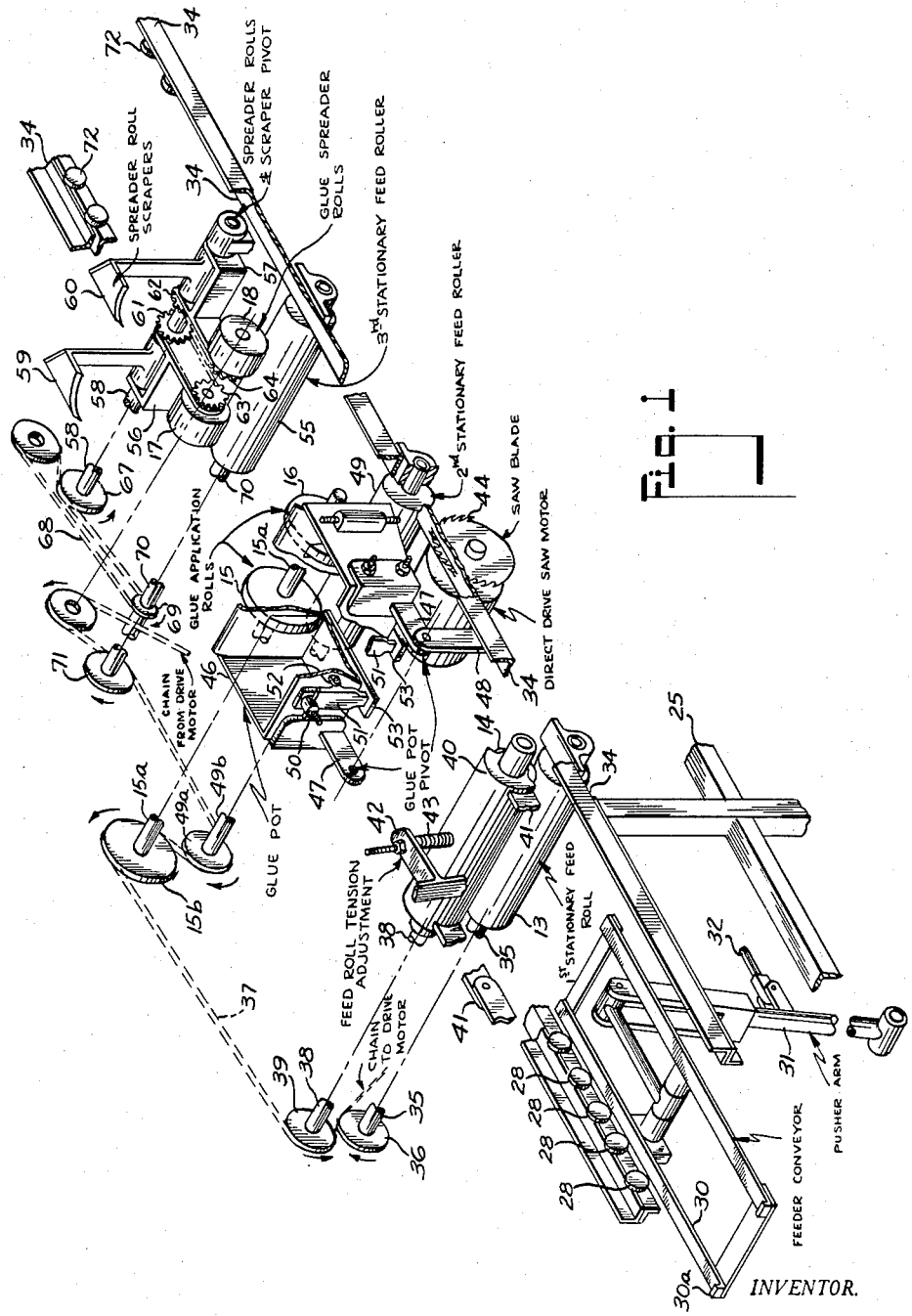
Fig. 1 is an exploded isometric view of the portion of a machine for the practice of the present method, the machine including the feeder-conveyor and the adhesive applicating means.
Figure 2:
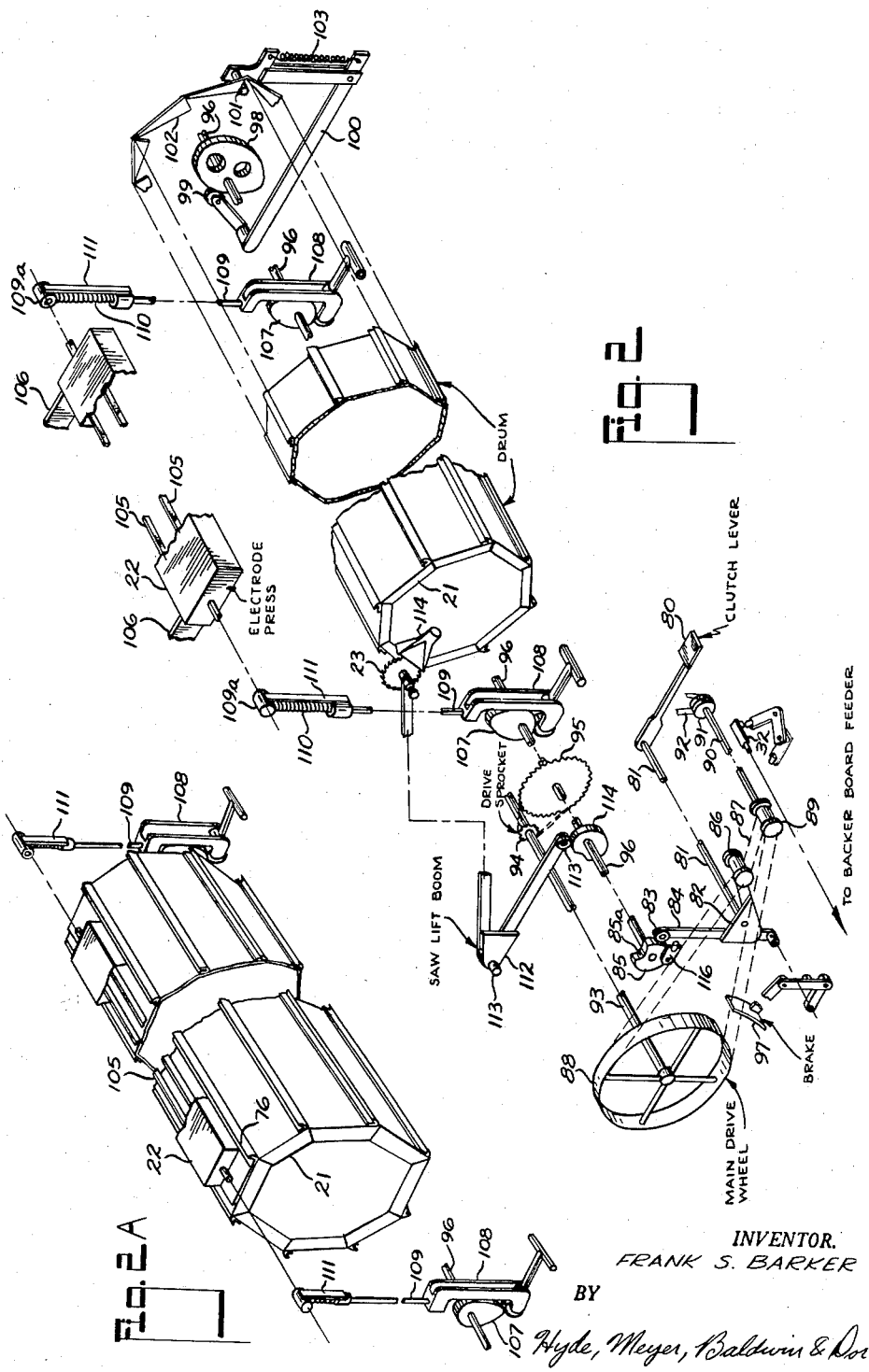
Fig. 2 is an exploded isometric view of the machine showing the rotating drum and adhesive drying means used in producing the present construction unit.
Figure 3:
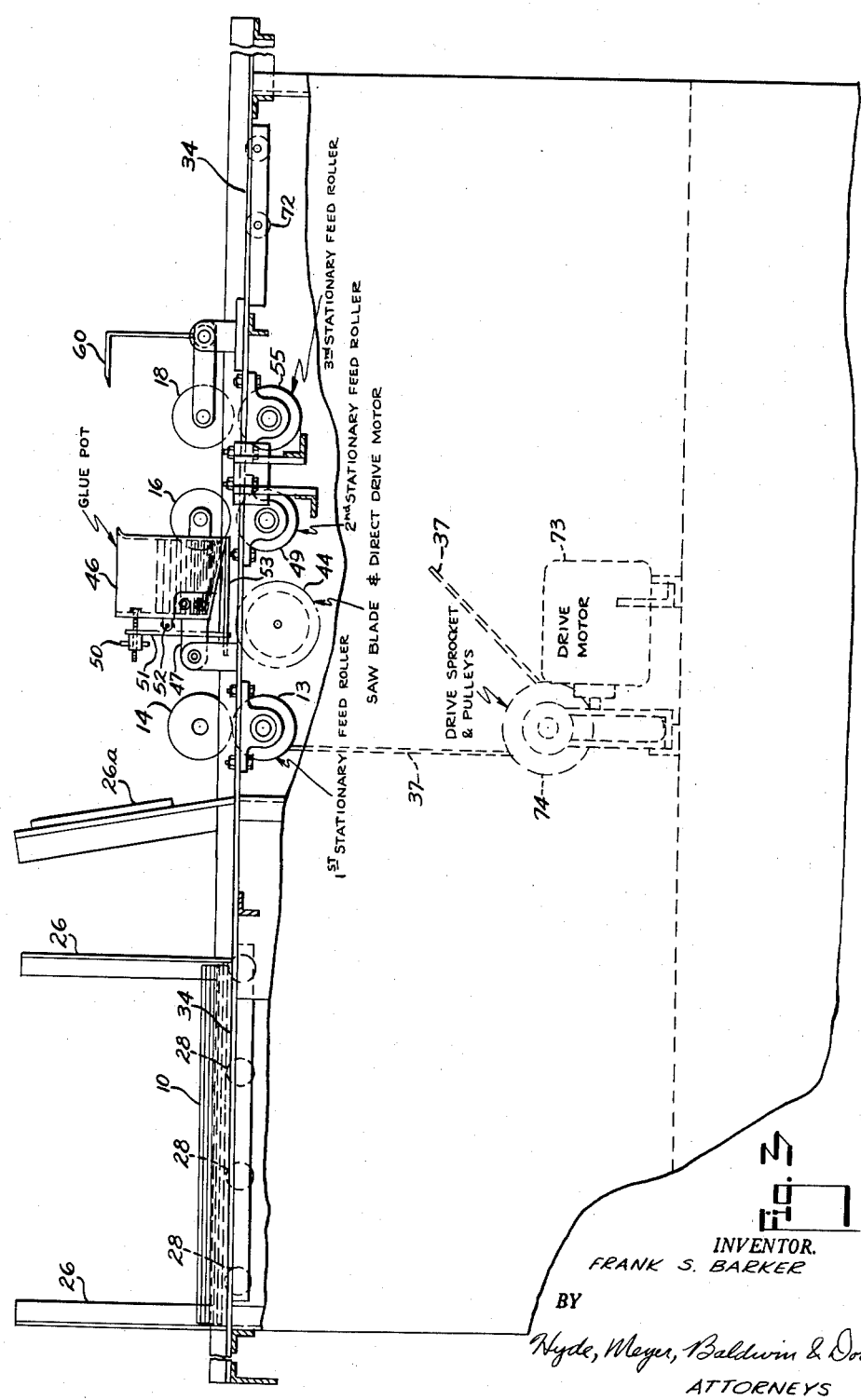
Fig. 3 is a side elevational view of the feeder-conveyor and adhesive applicator means shown in Fig. 1.

Referring to Figs. 1 and 3, I have shown a stack of backing boards 10 which are used to build the prefabricated construction units as seen in Fig. 6. The backing boards, as seen in Figs. 6 and 7, are used to secure a course of shingles or shakes 11 thereto in forming a prefabricated construction unit or shingle panel. In operation, the machine removes the lower backing board from the bottom of the stack 12 at the rear of the machine and moves the backing board forwardly through suitable stationary feed rollers 13 and 14 to a pair of adhesive application rollers 15 and 16. The rollers 15 and 16 apply adhesive to the upper surface of the backing board while it is in transit toward the front portion of the machine wherein the shakes or shingles are applied thereto. Following its passage under adhesive application rollers 15 and 16, the backing board travels beneath a pair of spaced adhesive spreaders 17 and 18, which are effective in smoothing out and spreading the adhesive strips laid down by adhesive applying rollers 15 and 16 respectively. That portion of the machine described above is enclosed within the housing 20, as seen in Fig. 5. Following the operation of spreading the adhesive strips, the backing board is presented at the left of the operator, as seen in Fig. 5. The operator removes the backing board from beneath the housing 20 and places it upon a rotatable drum 21, after which he places a course of shakes or shingles upon the adhesive containing surface of the backing board, as seen in Fig. 5. When the shakes have been applied to the backing board, the drum 21 is rotated into the position shown in Fig. 2a wherein the backing board and its associated shakes are maintained in a substantially horizontal position. An electrode heating press 22 is then lowered into contact with the outer surface of the shakes and thereby dries the adhesive to form a permanent bond between the backing board and the shakes. Upon further rotation of drum 20, a rotating saw blade 23, as seen in Fig. 2, trims the outermost edge of the shakes just prior to removal of the construction unit from the drum 21.

Referring now to Fig. 1, wherein I have shown an isometric exploded view of the various essential components of the machine for purposes of more clearly illustrating the construction of the machine and to facilitate understanding the operation of the machine. It will, of course, be understood that the machine includes a suitable supporting frame shown in part at 25 to which all of the parts are properly secured. Since the frame forms no part of the invention, it has been omitted, for purposes of clarity, to a large extent from the drawing. At the rear or left end of the machine, as seen in Figs. 1 and 3, a suitable hopper comprising upright angle irons 26, is supported in any convenient manner. The hopper, as seen in Fig. 2, is arranged to contain a supply of backing boards 10 in the form of a stack which rests upon a plurality of longitudinally disposed rollers 28.

Means are provided for successively removing the backing boards from the hopper and transferring them forwardly of the machine. The backing board transferring means include a feeder conveyor 30 which is slidably mounted on the machine frame and actuated by a pusher arm 31 which is connected to feeder linkage 32, as seen in Figs. 1 and 2, and in turn actuated by clutch lever 33 as hereinafter described. When the operator pushes clutch lever 33 the feeder linkage 32 actuates the feeder-conveyor in such a manner that the feeder-conveyor is moved under the stack of backing boards until the upstanding hook portions 30a provided at the end of the feeder-conveyor 30 engages the outermost end of the lowermost backer board and moves it forwardly of the machine toward the first pair of feed rolls 13 and 14. It will be understood that as the cycle of the machine is completed, the feeder linkage 32 and its associated feeder-conveyor return to the prime position, as shown in Fig. 1. The upstanding hook portions 30a have a thickness which is less than the thickness of one backing board so that no more than one backer board will be engaged by the hooks during a cycle of the machine. A stop bracket 26a prevents the stack of backer boards from moving forward as a unit, upon removal of the bottom board by means of the feeder-conveyor. The stationary feed rollers 13 and 14 receive the forward end of the backing board as it is advanced by the feeder-conveyor 30 and transfer it forwardly toward the adhesive applicating apparatus. The lowermost feed roller 13 is rotatably secured beneath the guide rail 34 and is driven by a horizontally disposed shaft 35 which is suitably journalled to the machine frame. The shaft 35 is provided with a sprocket 36 which is driven by an endless chain 37 which in turn is driven by a suitable drive motor hereinafter described. The uppermost roller 14 is also driven by means of a shaft 38 which is suitably journalled on the machine frame. Drive chain 37 engages a sprocket 39 located at the outer end of said drive shaft and thereby drives the upper roller 14. The upper roller 14 is rotatably contained within a suitable cover 40 which is pivotally secured by links 41 to the frame. The tension between rollers 13 and 14 may be controlled by the tensioning mechanism 42 which includes an adjustable compression spring 43.

A circular saw blade 44 projects upwardly through guide rail 34 to an extent wherein it provides a groove on the bottom face of the backer board adjacent one longitudinal edge of the same as it passes thereover and is fed forwardly through feed rollers 13 and 14 to provide a break-off line in the backer board which aids the consumer in aligning the panel during its installation. The saw blade 44 is driven directly by its own motor 45.

Means are provided for coating the upper surface of the backing boards with a pair of spaced strips of adhesive material. Said means includes the aforementioned adhesive applying rollers 15 and 16 which are suitably mounted so as to have a portion of their outer periphery extend into an adhesive supply contained in an adhesive pot or container 46 which is fixed to the machine frame by connecting members 47 and 48. The adhesive applying rollers 15 and 16 are driven by means of shaft 15a and drive pinion 15b which are driven by continuous chain 37. A stationary feed roller 49, driven through chain 37, pinion 49a and shaft 49b, is located directly beneath the adhesive application rollers 15 and 16 and aids in transferring the backing boards forwardly of the machine past the rollers 15 and 16. It will be noted that the adhesive container 46 is substantially rectangular in shape and contains two slots to receive the applicating rollers 15 and 16. The flow of the adhesive onto the outer periphery of the adhesive applicating rollers is regulated by wing nuts 50 which cause members 51 to pivot about 52 and pull or push flow regulating bars 53 to and from the outer periphery of the applicating rollers. Regulating bars 53 extend beneath the container 46 and are associated with the adhesive applicating rollers 15 and 16 at a zone directly beneath the lower end of the slots in the container 46. It is to be understood that the stationary roller 49 continues to move the backing board after it has left feed rollers 13 and 14. As the backing board is transferred forwardly of the machine by the roller 49 it is fed onto the stationary feed roller 55 above which are mounted the two adhesive spreader rollers 17 and 18 which are adapted to uniformly spread the adhesive deposited by the adhesive applicating rollers 15 and 16. The spreader rollers are mounted on a suitable frame 56 and 57 respectively which pivot about shaft 58. Shaft 58 also contains a pair of scrapers 59 and 60 which are adapted to keep the spreader rollers 17 and 18 free from adhesive and fibers from the backing board. The shaft 58 has drive pinions 61 and 62 rigidly secured thereto which are adapted to drive the spreader rollers 17 and 18 by means of continuous chains not shown, which engage the pinions 63 and 64 respectively secured to said spreader rollers. The scrapers 59 and 60 are mounted on upstanding arms 65 and 66 which are in turn pivotally secured to shaft 58. In operation the scrapers 59 and 60 and their associated arms are lowered into a position wherein the outer cutting edges of the blade are positioned very close to the outer periphery of the spreader rollers 17 and 18 so that any excess glue or other material from the backing boards will be immediately removed therefrom. The outer end of shaft 58 has affixed thereto a sprocket 67 meshing with a driven chain 68 which passes around a fixed sprocket 69 secured to the shaft 70 of roller 55. Shaft 70 is driven by means of endless drive chain 37 and sprocket 71. In this manner shaft 58 is continuously driven in rotation while the machine is operating and thus imparts rotative movement to the spreader rollers 17 and 18 by the means heretofore described. After the adhesive strips have been uniformly spread by the spreader rollers, the backing boards continue to be transferred toward the forward end of the carriage by means of stationary feed roller 55. The forward end of guide rail 34 is provided with a plurality of rollers 72 which are adapted to receive the backing boards and facilitate their removal from the guide rail 34.

A motor 73 is in driving engagement with a drive sprocket 74 which in turn drives the sprockets at the outer ends of the respective driven members of the machine as heretofore described, by means of endless drive chain 37.

As previously mentioned, the forward end of the guide rail 34 is contained within housing 20, as seen in Fig. 5. The operator has access to the backing boards contained on the forward end of the guide rail via space 75 in the housing. Thus, as each backing board reaches the forward end of the guide rail 34 the operator removes it therefrom and places it on the rotatable drum 21, and thereafter places a course of shakes or shingles 11 upon the top surface of the backing board, as seen in Fig. 5, in bonding relation with said backing board.

Referring now to Figs. 2, 2a and 5, wherein I have shown the apparatus for revolving the drum 21. This apparatus is contained within the housing portion 20a as seen in Fig. 5. The drum 21 is octagonal in shape and each face thereof is adapted to receive a backing board 10. The bottom edge of each face is provided with a member having an upstanding flange 76 which locates and supports the lower edges of the shakes 11. The upstanding flange portion 76 is spaced some distance below the lower edges of the backing board so that the bottom of the shakes extend somewhat below that of the backing board 10. The driving mechanism for actuating the present machinery includes a clutch lever 80 which the operator controls with his foot. Upon pressing the clutch downwardly, a shaft 81 is caused to rotate and thereby pivots a belt tightening boom 82 which has secured thereto a cam follower 83 and cam follower arm 84 which become disengaged from a notch 85a in cam 85. The belt tightening roller 86 is pressed against belt 87 and the increased pressure or tension in the belt causes the main drive wheel 88 to be turned due to the increased friction on the hub 89 of drive rod 90 which is connected by means of suitable sprockets 91 and belt 92 to a driving motor, not herein shown.

The main drive wheel 88 rotates drive shaft 93 which has rigidly secured thereto a driving sprocket 94 which by means of a continuous chain 94 drives a secondary sprocket gear 95 which is rigidly secured to a driven shaft 96. The belt tightening boom 82 also operates a brake 97 which engages main drive wheel 88. The brake 97 becomes disengaged from the drive wheel 88 upon actuation of clutch 80. The driven shaft 96 has rigidly secured thereto a drum activator cam 98. The drum activator cam 98 is continuously driven in rotation while the drive shaft rotates. A cam follower 99 engages the periphery of drum activator cam 98 through suitable linkage 100 causes rotation in the drum 21. The linkage 100 is provided with an outstanding pin 101 which engages a suitable ratchet surface 102 provided on the inner periphery of the drum 21 in such a manner as to rotate the drum enough to present a new face during each operation. After the cam linkage and outstanding pin 101 have rotated the drum 21 through one-eighth of a circle (since the drum here is octagonal in shape), a coil spring 103 causes the upstanding arm to return to the position shown in Fig. 2, wherein it is in a position to further actuate and rotate the drum. In other words, the upstanding pin 101 forms a drum activator which rests in a notch of ratchet 102 on the inside periphery of the drum 21. When the cycle of driven shaft 96 begins, the drum actually makes one-eighth of a cycle for each complete cycle of shaft 96.

The electrode press 22 is positioned above the drum 21 and its purpose is to quickly dry and render the adhesive between the backing board and the course of shakes dry and hard to thereby form a permanent bond between the backing board and shakes. The electrode press comprises a plurality of spaced electrodes which form pressing bars 105 which are contained within the housing 22 and supported by suitable frame members 106, shown in part in Fig. 2. The electrode press is disposed at a distance above the drum and as the drum rotates on its axis, the electrode press is brought successively into peripheral engagement with the outer surface of the shakes in such a manner that the electrodes or pressing bars 105 extend parallel to and in alignment with the strips of glue contained between the backing board 10 and the course of shakes 11.

Means are provided for raising and lowering the electrode press with each revolution of driven shaft 96. Said means take the form of a pair of spaced cams 107 which are rigidly secured to the driven shaft 96 and engage press actuating brackets 108 which are of U-shape and are suspended from the electrode press by means of rods 109. Each cam works against a coil spring 110 which constantly urge the electrode press into its upper position, as shown in Fig. 2. The coil springs 110 are contained on the rods 109 by means of an enlarged end portion 109a. The rods 109 extend freely through a bracket 111 which is rigidly secured to the frame of the machine. It will be understood that the electrode press 22 has substantially the same length as the rotating drum 21 and extends at least the full length of each of the backing boards 10 contained on the drum 21. The outermost shake, or that which is shown at the left end of Fig. 5, is trimmed by means of saw 23 at the instant the drum 21 again rotates the shake and its associated backing board following an application of heat from the electrode press 22. A suitable switch on the side of the drum rotating cam trips a timer switch for a generator, not shown, which provides power for the electrodes 105 in the electrode press 22.

The rotating saw 23 is connected to a boom 112 which raises and lowers the saw by means of a roller cam follower 113 which engages the outer periphery of cam 114 which is in turn rigidly secured to driven shaft 96. The saw lift boom 112 is pivotally connected by means of shaft 113 to the frame of the machine, not herein shown. The motor, not herein shown, for driving saw 23 is mounted on the saw lift boom 112 and continuously drives the saw 23 while the machine is in operation. A vacuum funnel 114 is also mounted on the saw lift boom by suitable means not herein shown and moves with the saw in response to actuation by boom 112.

Fig. 4 shows a somewhat diagrammatic view of the means employed for rotatably mounting the drum 21 on the frame of the machine. The drum 21 is supported on shaft 96 by means of a plurality of radially extending spokes, not herein shown, which extend from the shaft 96 radially outwardly and terminate around the circumference of the drum 21. Shaft 96 is supported by suitable bearings 120 and 121 to the frame 122 of the machine. A housing 20a covers the drum and is secured to the frame at its lower end.

When one cycle of the machine (which is measured by a complete rotation of driven shaft 96) is completed the roller 83 on belt tightening boom 82 drops back into the notch 85a on cam 85, thus loosening belt tightening roller 86 from drive belt 87 and allowing the brake 91 to be forced against the main drive wheel 88 by resilient means, not herein shown, to stop the operation.

In further pursuance of the description of the mode of operation of the present apparatus, it will be understood that upon pressing the clutch lever 80 the main drive wheel 88 is driven by means of belt 87 which is connected to a driving motor, as heretofore described. The main drive wheel 88 drives shaft 93 which drives shaft 96. Upon rotation of driven shaft 96, cam 98 causes the rotatable drum to index. Since the drum is octagonal in shape and presents eight faces, it will be understood that the drum indexes by making an eighth of a cycle for each complete rotation of the driven shaft 96. As the backing board containing a course of shakes reaches a substantially horizontal position as seen in Fig. 2a, the electrode press 22 is caused to be lowered by means of cams 107 mounted on driven shaft 96, as heretofore described.

During the rotative progress of the rotatable drum 21 ample time lapses while the backing board and its associated shakes are maintained in a horizontal position, as seen in Fig. 2a, for the heating effect of the electrode press to cause the desired drying of the adhesive and the latter therefore is in suitable condition for adhesion of the course of shakes to the backing board as already described.

The electrode press is brought successively into engagement with the outer surface of the shakes to thereby dry, through the application of heat, the adhesive material between the backing boards 10 and the course of shakes 11. After the press holding cams 107 allow the press holding brackets 108 and their associated rods 109 to rise, the drum 21 begins to rotate or index to discharge the backing board and associated course of shakes. As the drum indexes, the trimming saw 23 is activated by the saw lift boom 112 into the position shown in Fig. 2 wherein it trims the edge of the shakes along a desired line.

It will be noted that cam 85 has connected thereto suitable linkage 116 which is connected to the pusher arm 31, shown in Fig. 1, which actuates the feeder conveyor 30. Therefore, it will be understood that upon actuation of the clutch 80 and release of the cam roller follower 83 in the notch 85a in cam 85 the feeder linkage 32 causes a new backing board to be moved forward by the feeder conveyor 30 into the stationary feed rollers 13 and 14 for the application of adhesive strips, as heretofore described.

Thus, for each construction unit which is heated and dried by the electrode press a new backing board is advanced to the forward end of the guide rail or the area adjacent the operator where he may place it upon the rotating drum 21 and proceed with another operative cycle.

The structural units manufactured by the present machine comprise a baseboard 10 in a row or course of shakes shingles 11 which are applied to the baseboard so that the ends of the shingles project a substantial distance beyond the upper and lower edges of the baseboard. The ends so projecting are arranged in a straight line as illustrated in Figs. 6 and 7. The shingles 11 can be of random widths and irregular lengths, if so desired, and each shingle is attached to the baseboard by means of the adhesive materials applied in accordance with the present invention.

In applying the multiple shingle construction units to a wall or roof 130, as seen in Fig. 8, the construction units are laid up in a slightly overlapping relation. The baseboards 10 of the course being laid flush against the wall or roof surface in such a manner that the course of shingles being laid overlap the ends of the shingles of the course immediately below so that the shingles of the course being laid extend over and cover the upper end of the shingles and baseboard of the lower course of shingles therebelow. When so arranged, the construction units are secured in position by the simple expedient of driving nails or other fastening means through each construction unit and into the surface of the wall or roof. Thus, by having the baseboard secured flush to the wall or roof and the lower ends of the shingles of one course overlapping the top ends of the shingles of the course immediately below a highly watertight sheathing is provided.

In view of the foregoing description, taken in conjunction with the accompanying drawings, it is believed that a clear understanding of the present method will be quite apparent to those skilled in this art.

Having thus described my invention and illustrated its use, what I claim as new and desire to secure by Letters Patent is:

1. A method of making a construction unit consisting of advancing a backing board and grooving said advancing board on one surface thereof longitudinally therealong closely adjacent one edge, thence applying strips of adhesive material to the opposite surface of said backing board, thence spreading said adhesive strips uniformly on said opposite surface of said backing board, thence applying a course of shingles upon said opposite surface of said backing board in contact with said strips of adhesive material, thence applying heat whereby said adhesive material is dried and forms a bond between said backing board and course of shingles and thence trimming the edges of said shingles.

2. A method of making a construction unit consisting of stacking a plurality of backing boards and intermittently removing one of said backing boards from said stack, thence grooving one surface of said backing board longitudinally therealong and closely adjacent one edge thereof, thence advancing said backing board and applying strips of adhesive material to the opposite surface of said backing board, thence spreading said adhesive strips uniformly on said opposite surface of said backing board, thence applying a course of shingles upon said opposite surface of said backing board in contact with said strips of adhesive material, thence advancing said backing board and course of shingles to a source of heat, thence applying heat to said construction unit whereby said adhesive material is dried and forms a permanent bond between said backing board and course of shingles and thence trimming the edges of said shingles.

References Cited in the file of this patent

UNITED STATES PATENTS

| | | |
|---|---|---|
| 81,579 | Bailey | Sept. 1, 1868 |
| 1,363,559 | Boylan | Dec. 28, 1920 |
| 1,592,760 | Fischer | July 13, 1926 |
| 1,917,930 | Fischer | July 11, 1933 |
| 1,939,004 | Fischer | Dec. 12, 1933 |
| 2,719,808 | Elmendorf | Oct. 4, 1955 |
| 2,744,046 | Ware et al. | May 1, 1956 |